(12) United States Patent
Snead (10) Patent No.: US 8,934,007 B2
(45) Date of Patent: Jan. 13, 2015

(54) RAIL STRESS DETECTION SYSTEM AND METHOD

(75) Inventor: Edwin deSteiguer Snead, Georgetown, TX (US)

(73) Assignee: Georgetown Rail Equipment Company, Georgetown, TX (US)

(*) Notice: Subject to any disclaimer, the term of this patent is extended or adjusted under 35 U.S.C. 154(b) by 417 days.

(21) Appl. No.: 13/428,215

(22) Filed: Mar. 23, 2012

(65) Prior Publication Data

US 2013/0070083 A1    Mar. 21, 2013

Related U.S. Application Data

(60) Provisional application No. 61/467,307, filed on Mar. 24, 2011.

(51) Int. Cl.
| | | |
|---|---|---|
| H04N 7/18 | (2006.01) | |
| G01L 1/24 | (2006.01) | |
| G01L 1/00 | (2006.01) | |
| B61L 23/04 | (2006.01) | |

(52) U.S. Cl.
CPC ... G01L 1/24 (2013.01); G01L 1/00 (2013.01); B61L 23/044 (2013.01); B61L 23/045 (2013.01); B61L 23/047 (2013.01); B61L 23/048 (2013.01)
USPC ........... 348/125; 348/126; 348/127; 348/128; 348/129; 348/130; 348/131; 348/132; 348/133

(58) Field of Classification Search
CPC ............ G01L 1/00; G01L 1/24; G01N 21/88; G01N 21/956; H04N 7/18; H04N 5/217; G06T 7/0004
USPC ......................................................... 348/125
See application file for complete search history.

(56) References Cited

U.S. PATENT DOCUMENTS

| | | | | |
|---|---|---|---|---|
| 4,005,601 | A | * | 2/1977 | Botello .......................... 73/146 |
| 4,573,131 | A | * | 2/1986 | Corbin .......................... 702/168 |
| 6,651,034 | B1 | * | 11/2003 | Hedlund et al. .............. 702/183 |
| 6,691,064 | B2 | * | 2/2004 | Vroman ........................ 702/183 |
| 8,006,559 | B2 | * | 8/2011 | Mian et al. ...................... 73/643 |
| 8,412,393 | B2 | * | 4/2013 | Anderson et al. ............... 701/19 |
| 8,615,110 | B2 | * | 12/2013 | Landes et al. ................. 382/104 |
| 8,655,540 | B2 | * | 2/2014 | Mian et al. ................... 701/29.1 |
| 8,711,222 | B2 | * | 4/2014 | Aaron et al. .................. 348/148 |
| 2002/0078853 | A1 | * | 6/2002 | Holmes et al. .................... 104/2 |
| 2004/0143417 | A1 | * | 7/2004 | Hedlund et al. .............. 702/183 |
| 2004/0263624 | A1 | * | 12/2004 | Nejikovsky et al. ........... 348/148 |
| 2005/0204949 | A1 | * | 9/2005 | Jacob ........................... 105/72.2 |
| 2009/0037039 | A1 | * | 2/2009 | Yu et al. ......................... 701/19 |
| 2009/0055041 | A1 | * | 2/2009 | Mian et al. ..................... 701/29 |
| 2009/0055043 | A1 | * | 2/2009 | Mian et al. ..................... 701/29 |
| 2009/0132179 | A1 | * | 5/2009 | Fu et al. ......................... 702/34 |
| 2011/0233293 | A1 | * | 9/2011 | Kral et al. ..................... 238/122 |
| 2012/0222579 | A1 | * | 9/2012 | Turner et al. ...................... 104/2 |
| 2012/0232813 | A1 | * | 9/2012 | Lawson et al. .................. 702/58 |
| 2012/0274768 | A1 | * | 11/2012 | Aaron et al. .................. 348/148 |

* cited by examiner

Primary Examiner — Andy Rao
Assistant Examiner — Shan Elahi
(74) Attorney, Agent, or Firm — Parsons Behle & Latimer (57) ABSTRACT

A system for detecting stress in rails includes a railcar, having a rail temperature detector, and a rail imaging device oriented to produce images of rail joints and rail anchors. The imaging device and temperature detector are connected to a computer controller, which is programmed to provide an output signal indicative of estimated axial stress in the rail based upon rail temperature and the images of at least one of the rail joints and rail anchors.

17 Claims, 4 Drawing Sheets

RAIL STRESS DETECTION SYSTEM AND METHOD

PRIORITY CLAIM

The present application claims the benefit of U.S. Provisional patent application Ser. No. 61/467,307, filed on Mar. 24, 2011, and entitled RAIL STRESS DETECTION SYSTEM AND METHOD.

BACKGROUND

1. Field of the Invention

The present invention relates generally to the maintenance of railroad tracks. More particularly, the present invention relates to a system and method for detecting tensile or compressive stress in railroad rails that are in use.

2. Related Art

The old-time "clickety clack" of railroad travel was caused by bolted joints in the rails, alternating left and right. These joints were usually 39 feet apart because the open-top gondola cars used for transporting new rails were 40 feet long, and rail segments were sized to fit these cars. In the early twentieth century, "continuous welded rail" (CWR) was invented, and the railroad companies began converting to CWR around 1950. Continuous welded rail typically comes in 440 yard (0.25 mile) segments which are spiked down to the crossties, and successive rail segments are then welded together in the field into "blocks" that are about two miles long. Where continuous welded rail is used, the only bolted joints are the ones at the ends of blocks, and these are electrically insulated to keep the adjoining track circuits separate.

As is well known, temperature changes cause metal, including railroad rails, to expand and contract, which presents several challenges for railroad maintenance. If the resulting forces from thermal expansion and con reactions are not properly controlled, rail joints can pull apart in the winter or rails can buckle in the summer, with what are called "sun kinks." Pulled-apart rail joints and sun kinks can both derail a train. Unfortunately, systems and methods to assess internal rail stresses in railroad track in order to predict and thereby prevent track buckles and pull-aparts are inadequate in many respects.

SUMMARY

It has been recognized that it would be advantageous to develop a mobile, non-destructive system for assessing internal rail stresses, which can be widely deployed.

In accordance with one embodiment thereof, the present invention provides a system for detecting stress in rails, comprising a railcar, having a rail temperature detector, and a rail imaging device oriented to produce images of rail joints and rail anchors. The imaging device and temperature detector are connected to a computer controller, which is programmed to provide an output signal indicative of estimated axial stress in the rail in view of rail temperature and at least one of size of a rail gap at a rail joint and distance of slippage of a rail anchor relative to its intended position.

in one embodiment, the system for detecting stress in rails can include a rail incline detector, such as an inclinometer or GPS system.

In accordance with another aspect thereof, the invention provides a method for detecting axial stress in a rail, comprising detecting a size of a rail gap at a rail joint, and estimating axial stress in the rail based upon the size of the gap and at least one of rail temperature and incline of the rail.

In accordance with another embodiment thereof, the method can include detecting a distance of slippage of a rail anchor relative to its intended position, and estimating axial stress in the rail in based upon the distance of slippage and at least one of rail temperature and incline of the rail.

BRIEF DESCRIPTION OF THE DRAWINGS

Additional features and advantages of the invention be apparent from the detailed description which follows, taken in conjunction with the accompanying drawings, which together illustrate, by way of example, features of the invention, and wherein.

DETAILED DESCRIPTION

Reference will now be made to exemplary embodiments illustrated in the drawings, and specific language will be used herein to describe the same. It will nevertheless be understood that limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
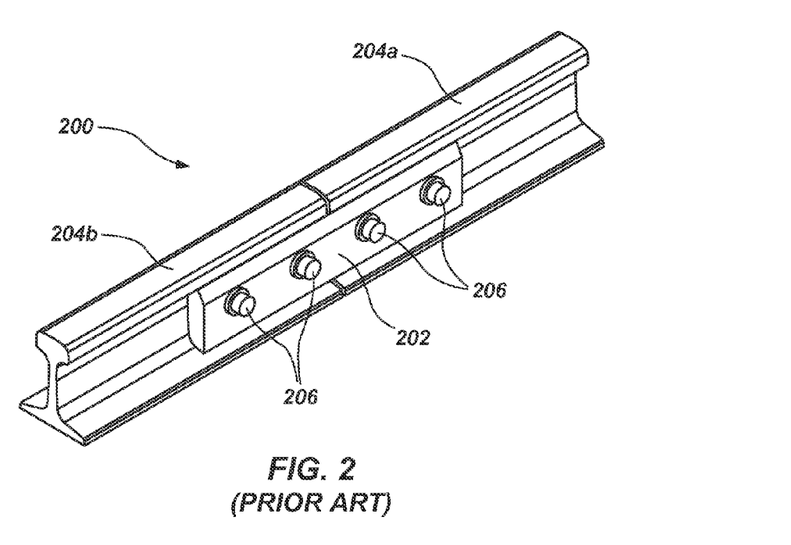
FIG. 2 is a perspective view of a traditional bolted rail joint.
Figure 3A:
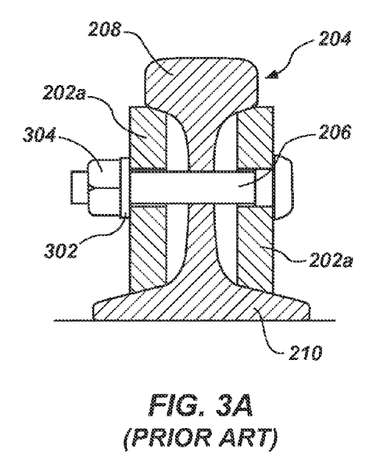
FIG. 3A is a cross-sectional view of one embodiment of a rail and bolted rail joint like that of FIG. 2.
Figure 3B:
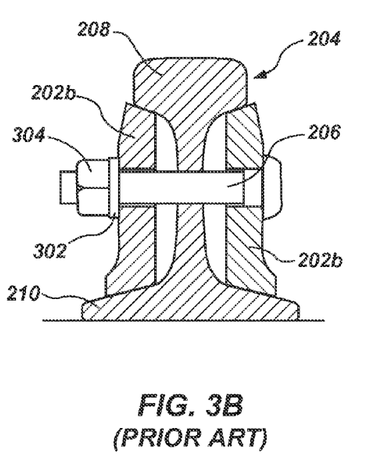
FIG. 3B is a cross-sectional view of another type of bolted rail joint like that of FIG. 1.

As noted above, legacy railroad tracks in the U.S. had bolted joints every 39 feet, which caused the telltale clickety-clack of railroad trains. A perspective view of a traditional bolted rail joint is shown in FIG. 2, and cross-sectional views of two embodiments of a rail and bolted rail joint are shown in FIGS. 3A and 3B. As shown in FIG. 2, the simplest bolted joints 200 were made up of two "angle bars" 202 that were about two feet long and interconnected adjacent rail segments 204a, b. The angle bars 202 included four holes each, with four bolts 206, and lock washers (302 in FIGS. 3A, B) and nuts (304 in FIGS. 3A, B) to secure the bolts. The cross-sectional views of FIGS. 3A and 3B show the rail 204, with angle bars 202, bolts 206, washers 302 and nuts 304. Two different types of angle bars 202 are shown in FIGS. 3A, B. Shown in FIG. 3A is one type of angle bar 202a, and a different type of angle bar 202b is shown in FIG. 3B. The angle bars were wedged between the top flange 208 and bottom flange 210 of the rails, and held tightly by the bolts 206 to make the two adjoining rails function almost as though they were continuous. Nevertheless, traditional rail joints have been a common source of trouble for railroads.

The advent of continuous welded rail has helped reduce maintenance problems associated with rail joints. As noted above, continuous welded rail typically comes from the steel mills in 440 yard (0.25 mile) segments. In a typical operation, CWR rail segments are transported to a job site on a train that is a quarter of a mile long. Once a given rail segment is spiked down to the crossties, successive segments are welded together in the field into "blocks" that are about two miles long. The blocks are made this long because some trains are more than anile long, and for operational and safety purposes it is desirable that there is never more than one train physically occupying a single block.

Figure 4:
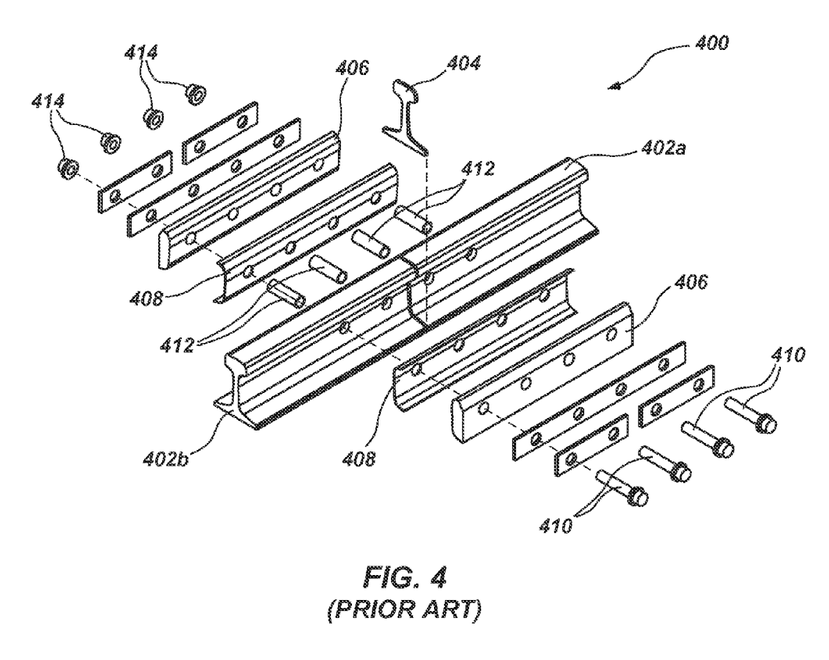
FIG. 4 is an exploded, perspective view of an electrically insulating bolted rail joint that is typically provided at the end of a rail block in a modern railroad.

Train traffic is controlled by "track circuits" which apply about five volts difference in electric potential between the left and right rails of each block, and couple this voltage potential to railroad signals at the ends of the blocks. Trains have solid steel wheels and axles, which short out the electric track circuits whenever a train occupies a given block. When the voltage circuit is open (i.e. no train is present), the signals are green. However, when a train occupies a given block and shorts out the circuit, the signals at the ends of that block turn red, and signals at the ends of adjoining blocks turn orange or amber. For safety purposes, railroads have strict regulations that prohibit train crews from ever travelling into a red block.

Where continuous welded rail is used, the only bolted joints are the ones at the ends of blocks, and these are electrically insulated to keep the adjoining track circuits separate. These insulated joints have many more parts, and are much longer and more expensive than ordinary bolted joints. An exploded perspective view of an electrically insulating bolted rail joint that is typically provided at the end of a rail block in a modern railroad is provided in FIG. 4. As this figure shows, this rail joint 400, configured to join two rails 402a, b, includes a rail insulator 404, angle bars 406, angle bar insulating plates 408, bolts 410, bolt insulating sleeves 412 and nuts 414, among other parts. This type of joint provides a secure mechanical connection between adjacent rails, and also electrically insulates the rail segments.

As with all metals, however, rails expand or contract with changes in temperature. Continuous welded rail is tightly clamped to the crossties so that thermal expansion and contraction is resisted by the crossties and ballast, and converted into compressive or tensile stress in the rail, rather than freely allowing the rail to physically expand or contract significantly. In order to do this, during track installation, the rail is typically heated to a "neutral" temperature (e.g. 100° F.) and then secured to the crossties at this temperature. As the rail cools, the crosstie connections will substantially prevent the rail from physically contracting, and will instead induce tensile stress in the rail. In this way, the magnitude of thermal expansion and contraction that would normally occur along a one or two mile stretch of rail is dramatically reduced, and replaced with tensile stress. Although the total thermal expansive forces generated can be very large, these forces are proportional to distance along the rail, and thus only a few hundred pounds must be resisted by each crosstie.

Figure 1:
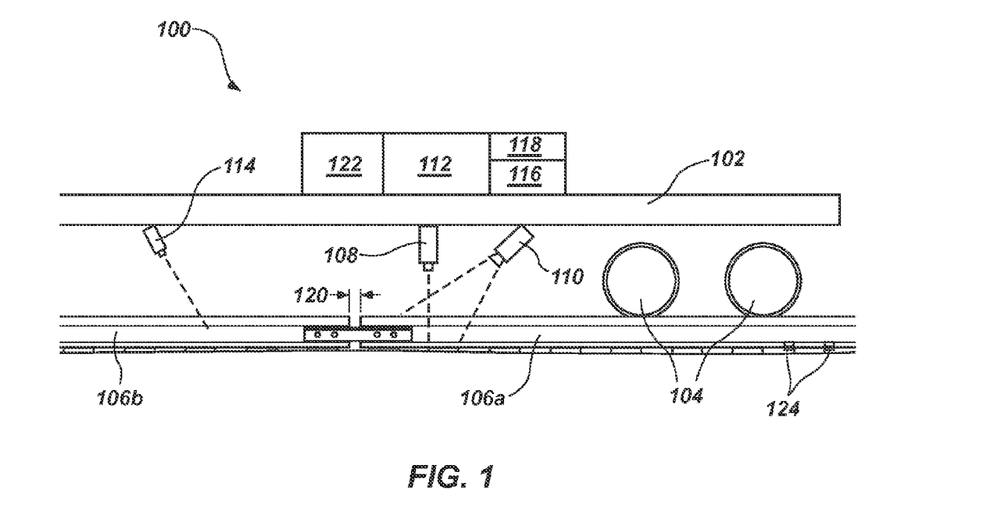
FIG. 1 is a side view of an embodiment of a railcar configured for detecting stress in rails.
Figure 5:
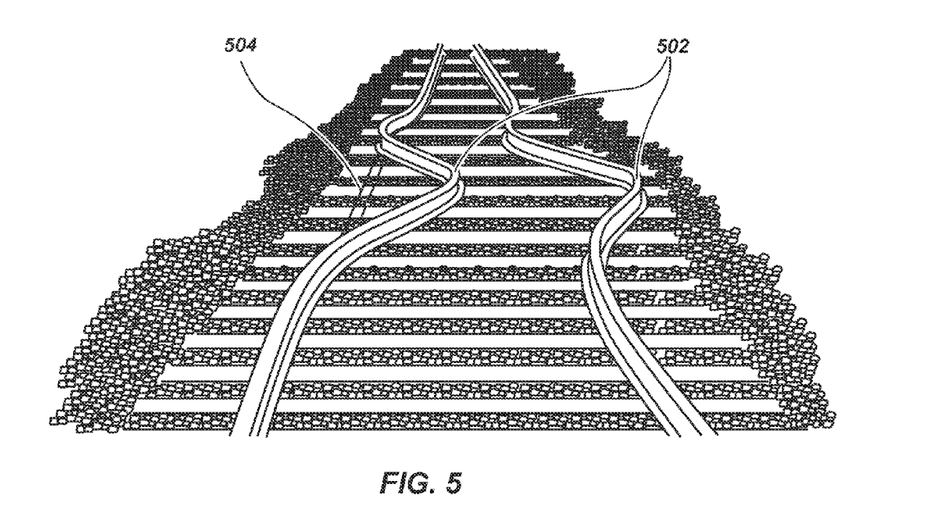
FIG. 5 is a perspective view of a section of rail that has buckled due to thermal expansion of the rails.

Nevertheless, temperature extremes can cause significant challenges for maintaining rail joints. In the United States, there are places where winter temperatures can get as low as −50° F., and on a summer afternoon rails can get as hot as 145° F. If the resulting forces from thermal expansion and contraction are not properly controlled, rail joints can pull apart in the winter or rails can buckle in the summer, with what are called "sun kinks." An example of rails that are pulling apart is shown in FIG. 1, wherein the adjacent rails 106a, b have a significant linear gap 120 at a rail joint. An example of sun-kinked rail is shown in FIG. 5. Here it can be seen that the rails 502 have buckled and diverged from their proper alignment, detaching rail spike connections 504 and other parts of the railroad track. Pulled-apart rail joints and sun kinks can both derail a train.

Unfortunately, systems and methods to assess internal rail stresses in railroad track in order to predict and thereby prevent track buckles and pull-aparts are inadequate in many respects. Experts in the railroad industry have recognized a need for a mobile non-destructive technology to assess inter rail stresses in track. There has been progress in this area, and some potential new technologies have been identified. However, such methods have not been widely deployed across rail networks, and there is still substantial risk from track buckles and pull-aparts.

Advantageously, the present disclosure provides a mobile, non-destructive system and method for assessing internal rail stresses that can be deployed widely. Advantageously, a stress detection vehicle has been developed that can be part of the consist of any train and can travel unattended over any railroad system, finding places where stress in the rails is approaching destructive levels. One embodiment of a stress detection car in accordance with the present invention is shown in FIG. 1. The stress detection car 100 generally comprises a railcar having a frame 102 and wheels 104 for riding on the rails 106. The stress detection vehicle can be a modified freight car, for example, or other types of rail vehicles can be used, such as a locomotive, a hi-rail vehicle, passenger car, etc. Any vehicle that can travel on the rails can be used, and the frame 102 and wheels 104 are intended to be representative of any type of rail vehicle. While the view of FIG. 1 shows only one side of the stress detection railcar 100 and one rail 106 of the railroad track, it is to be understood that the opposite side of the railcar can include the same features for use in connection with the opposite rail.

Attached to the frame 102 are a pair scanning laser emitters 108 (one for each a and a CCD camera 110 (one for each a which are connected to a computer controller 112. The laser emitters, camera and computer controller together provide a 3-D laser imaging system. The camera 110 can be either a grayscale or color camera. Suitable lighting equipment (not shown) for the imaging system can also be attached to the stress detection car. The stress detection car 100 also includes a no-contact infrared thermometer 114 that is oriented toward the rails 106, and can also include an inclinometer 116, and a GPS receiver 118. The thermometer 114, inclinometer 116 and GPS device 118 are all connected to the computer controller 112.

As the stress detection ear 100 moves along the rails, the lasts emitters 108 scan the rails 106 transverse to the direction of motion of the railcar 100. The CCD camera 110 generates images of the scanned rails, and the computer controller 112 analyzes these images to determine conditions related to bolted rail joints and rail anchors. The infrared thermometer 114 indicates the temperature of the rail, and the GPS receiver 118 and inclinometer 116 allow the system to determine the incline or grade of the rails at the same time. The temperature and grade information allows the computer controller 112 to determine what level of stress exists in the rails in view of the condition of rail joints and rail anchors. The GPS system 118 can also be used to pinpoint the location of a fault or defect (e.g. a bad rail joint) when it is found. The incline of the rails can be determined using the inclinometer only, or using the GPS system only, or using both devices together. It should also be appreciated that other devices that can measure the incline of the track wile traveling over it can also be used.

Referring to FIG. 1, the visual detection system of the stress detection car 100 can be configured in accordance with the system disclosed in U.S. Pat. No. 7,616,329, the disclosure of which is incorporated herein by reference its entirety. Specifically, the computer controller 112 includes a microprocessor and system memory, and is provided with software stored on digitally readable media, for analyzing images to detect stress-related features in rails. The controller 112 can also include other input and output devices (not shown) and other data storage devices, such as a hard drive, flash memory, CD-ROM devices, non-volatile memory, etc.

The laser emitter 108 projects a laser line across the rail 106 and roadbed. The camera 110 takes successive images of this projected line, and sends image data directly to the processing device 112 via transmission lines (not shown). The camera 110 can also include a processor capable of converting or formatting the captured image of the projected line into a dimensional profile that is sent directly to the processing device or computer 112. The ability of the camera 110 to process or format the captured image in this way can eliminate the need for expensive post processors or high-speed frame grabbers. A suitable camera for this type of inspection system having such processing abilities includes a Ranger M50 manufactured by IVP Integrated Vision Products, Inc.

The controller can further include an input/display (not shown) for a track inspector to input and review data and to operate the disclosed inspection system. The controller operates with suitable software programs for storing and analyzing the various data obtained with the disclosed inspection system. For example, the controller 112 can have any suitable image processing software, such Matrox MIL, Common VisionBlox, Labview, eVision, Halcon, and IVP Ranger. The cat roller 112 can also have image processing tools known in the art for analyzing image data from the cameras 110, such as Region of Interest (ROI) tools, filtering tools, blob tools, edge finders, histogram tools, and others.

To effectively process all of the data obtained with the disclosed stress detection system 100, the controller 112 in one embodiment includes a computer having a fast processor, such as an Intel Pentium 4 processor capable of running at 2.8 GHz. To effectively store all of the data obtained with the disclosed inspection system, the digital memory or storage device(s) can include, for example, two large-capacity hard drives configured to use both read/write mechanisms simultaneously as one drive, which is also known as a Redundant Array of Independent Disks (RAID) system. The fast processor and the dual hard drives can allow for sustained real-time storage of the data obtained. In one embodiment, the power for the stress detection system 100 can be provided by 110 V AC power from a belt driven generator running directly off an engine of an inspection vehicle (e.g. a hi-rail vehicle). Alternatively, the stress detection system 100 can be provided with electrical power from an attached locomotive (not shown), or from a generator 122 that is associated with the stress-detection railcar 102.

With the light beams from the light emitters 108 projected onto the irregular surface of the track 106 and viewed at an angle by the camera 110, the projected line follows the contours of the surface and components of the track bed. The image data or frame includes a plurality of pixels having X-Y coordinates, and shows a contour of the track bed captured by the cameras. As a result of filtering and other image processing techniques known in the art, the image includes two pixel values, where the dark pixels represent the contour of the track bed. Every pixel of a given image data is given the same Z-coordinate, which represents the particular position along the length of the track at which the image data was captured. In this manner, a plurality of captured images produce a three-dimensional scan of the track bed in which each image of the scan has X-Y coordinates showing the contour of the track bed and has a Z-coordinate representing the particular position of the contour along the length of rail. In this way, the system can recognize and quantify characteristics of features of the track, including rail joint widths and rail anchor positions relative to railroad ties.

Figure 6:
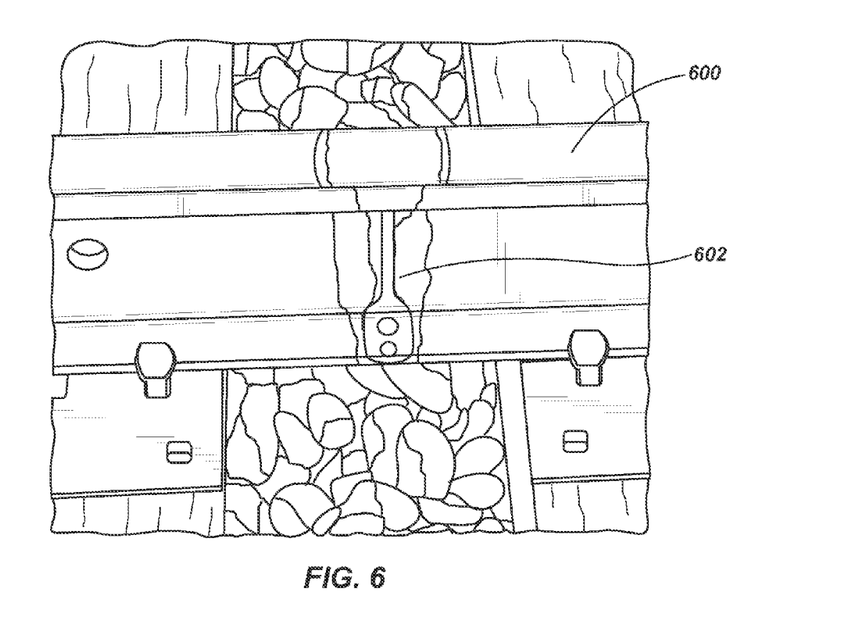
FIG. 6 is a perspective view of a field weld of a rail.

The stress detection car 100 is equipped to detect two different kinds of evidence of stress. The first and simplest type of evidence comes from the thousands of common bolted joints that must be inserted in welded track whenever a defective rail is discovered. When a defective rail is found, the most common repair is to cut out a section of defective rail, and insert or splice in a new piece of rail with a bolted joint at each end. The intention with this sort of repair is to quickly replace the bolted joints with field welds. A perspective view of a rail 600 having a field weld 602 is provided in FIG. 6. However, since track time is precious, this welding is frequently delayed. Furthermore, one of the bolted joints can usually be welded at the first opportunity, hut the second joint must wait until the adjoining track is at the proper "neutral temperature." On a busy track this wait can be weeks or months. Consequently, there can be thousands of bolted joints in otherwise welded track at any given time.

Bolted rail joints typically include some slack, resulting in small gaps between the ends of the adjoining rails when the steel contracts at low temperatures. Such a gap 120 is shown in FIG. 1. When the steel rail 106 heats up it expands, and the gap 120 closes up. However, if there is a joint where the gap is closed when the rail is cold, this indicates potential trouble when the ambient temperature increases. The desired neutral temperature is usually around 90° F. 100° F. If a rail is found in compression at 70° F., destructive compression stress can be expected when the rail gets up to 140° F. on summer afternoon, for example. Conversely, if a rail joint is found to have a significant gap when the rail temperature is 100° F., a tensile pull-apart condition can be expected when the rail temperature drops to 25° F. or lower. The visual detection system of the stress detection car 100 can recognize and quantify the gap in a rail joint as it passes over the joint, and this information, taken in conjunction with the temperature of the rail, will indicate whether that rail joint is in danger from future thermal expansion or contraction.

Not every bolted joint needs immediate attention. One function of the system and method described herein is to call a roadmaster's attention to those joints which might be moved higher on his priority list.

The second type of rail stress evidence that is detected by the rail stress car 100 comes from rail anchors 124 that are not snug up against the crossties and tie plates. A perspective view of a rail 700 having a pair of rail anchors 702 adjacent to a given railroad tie 704 is provided in FIG. 7. Rail anchors serve to hold a given location of a rail in place against a given tie in order to resist the rail being pushed or pulled by the motion of trains.

There are very few places where railroad tracks are truly level. Trains are nearly always either climbing or descending, and the grades can be as much as two percent or more. A long train can have more than a hundred cars, weighing about 130 tons each, so that a loaded train could weigh more than 13,000 tons. With this sort of load on a two percent uphill grade, the locomotive wheels must provide 260 tons of traction, effectively pushing the rails downhill in order to move the train uphill. When the train goes downhill the engineer usually applies the brakes gently on every one of the train's 400 axles, so that when going downhill there could be a total of 260 tons of force applied by the wheels, again pushing the rails downhill. Basically, the movement of trains in either direction, either uphill or downhill, effectively pushes the rails into every valley. Rail anchors are intended to resist this tendency.

After many trains have traversed a given section of rail, the rails in the valleys will be in compression, and those on the hilltops will be in tension, regardless of the temperature. If a rail is in compression even when it's cold, there can be trouble when it heats up. Most sun kinks happen in valleys. Conversely, if a rail joint is wide, even in warm weather, there can be a pull-apart when temperatures drop.

Figure 7:
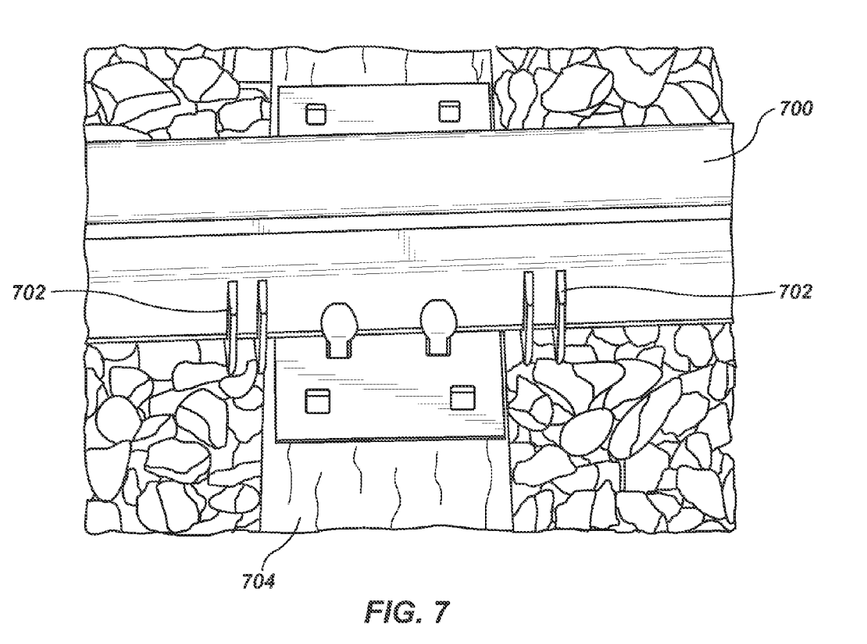
FIG. 7 is a perspective view of a rail having a rail anchor that has slipped due to the force of passing trains, with a field weld visible to the left.

Rail anchors are usually applied on both sides of every crosstie where trouble is expected. After a few hundred trains have passed, anchors on the uphill sides of the crossties are likely to have slipped while the rails were pushed downhill. The downhill anchors will not have slipped, but as the rail travels downhill there will be gaps between the anchors and the downhill sides of the crossties. The view of FIG. 7 shows a rail anchor 702 on the right that has slipped, away from its adjacent tie 704 due to the force of passing trains.

The visual detection system of the stress detection car 100 can recognize and quantify the relative position of rail anchors 702 with respect to adjacent cross ties 704 as it passes over the rail anchor, and this information, taken in conjunction with the incline and temperature of the rail, will indicate whether and how much the rail has slipped downhill. The stress detection car measures the grade as well as the temperature. It can tell if a substantial number of anchors have slipped a substantial distance the same direction on a substantial grade, giving evidence of potential trouble. The magnitude or amount of slippage of the rail anchor indicates how far the rails have moved since the last time the anchors were tightened up. This stress detection system can thus estimate a magnitude of stress in the rails based on the amount of slippage of a rail anchor, and thus help call attention to places that deserve closer attention from maintenance crews.

Once the visual detection system of the stress detection car 101) recognizes and then quantifies the magnitude of a rail joint gap or the distance that a rail anchor has slipped, the computational system (i.e. computer controller 112) can identify conditions that are likely to lead to excessive and dangerous stresses that could cause buckling or pull-aparts in the rail. Alternatively, the computational system can be programmed to estimate the actual stress level in the rail using suitable programming routines. For example, given the temperature of the rail and the size of a rail joint gap at the titre of inspection, as well as the coefficient of thermal expansion of the rail (which is a known constant), the system can estimate whether anticipated expansion of the rail at the expected hottest condition will close the gap and result in compressive stress in the rail that will lead to buckling. The stress from expansion and the likelihood of buckling can be computed based on the principles of thermodynamics and column buckling of laterally-supported columns. Based on these same parameters, the system can also estimate the likelihood of a pull-apart in low temperature conditions based on the known shear strength of bolts that connect rail joints.

Other parameters that are measured by the system disclosed herein can also be used to estimate rail stress. For example, the incline of the rail and/or its location relative to known hills and valleys along the rail line be used to estimate rail stress. The system can estimate the stress in the rail based on the magnitude of slippage of a rail anchor and the prevailing or average grade and direction of grade along a given rail segment. The position of a rail joint or rail anchor relative to the known position of a crest of a hill or the bottom of a valley can also be used to estimate rail stress.

It is to be understood that the above-referenced arrangements are only illustrative of the application of the principles of the present invention in one or more particular applications. Numerous modifications and alternative arrangements in form, usage and details of implementation can be devised without the exercise of inventive faculty, and without departing from the principles, concepts, and scope of the invention as disclosed herein. Accordingly, it is not intended that the invention be limited, except as by the claims presented hereafter.

What is claimed is:

1. A system for detecting axial stress in rails, comprising:
   a rail vehicle, having
      a rail temperature detector;
      a rail imaging device, oriented to produce images of at least one of a rail joint and a rail anchor;
      a rail incline detector, selected from the group consisting of an inclinometer and a GPS device, the GPS device being adapted to pinpoint a location of the rail joint or rail anchor; and
      a computer controller, coupled to the rail imaging device and the temperature detector, programmed to estimate axial stress in the rail, and to provide an output signal indicative of the estimated axial stress in the rail, based upon rail temperature and at least one of a size of a rail gap at the rail joint and a distance of slippage of the rail anchor relative to its intended position, based upon the images of the at least one of the rail joint and rail anchor.

2. A system in accordance with claim 1, wherein the computer controller is programmed to estimate axial stress in the rail further in view of and the rail incline.

3. A system in accordance with claim 1, wherein the rail temperature detector comprises an infrared thermometer, oriented toward the rail.

4. A system in accordance with claim 1, wherein the rail vehicle is selected from the group consisting of a railcar, a locomotive, and a hi-rail vehicle.

5. A system in accordance with claim 1, wherein the GPS device is configured to provide a signal indicative of a position of the vehicle.

6. A system in accordance with claim 1, wherein the rail imaging device comprises a laser emitter, configured to project a laser line across the rail, and a camera, configured to take successive images of the projected line as the rail vehicle moves along the rail, and to send a corresponding image data signal to the computer controller.

7. A system in accordance with claim 6, further comprising a processor, associated with the camera, programmed to convert the captured images of the projected line into a dimensional profile, and to send a signal indicative thereof to the computer controller.

8. A method for detecting axial stress in a rail, comprising:
   detecting a size of a rail gap at a rail joint;
   detecting an incline of the rail at a location of the rail joint using one of an inclinometer and a GPS device;
   determining the location of the rail joint using the GPS device;
   detecting a temperature of the rail at the rail joint; and
   estimating axial stress in the rail using a computer controller that is programmed to estimate axial stress in the rail based upon the size of the gap and at least one of the rail temperature and the incline of the rail.

9. A method in accordance with claim 8, further comprising detecting a distance of slippage of a rail anchor relative to its intended position, and estimating axial stress in the rail based additionally upon the distance of slippage of the rail anchor.

10. A method in accordance with claim 8, wherein detecting the rail temperature comprises detecting the rail temperature using an infrared thermometer, oriented toward the rail.

11. A method in accordance with claim 8, wherein the step of detecting the size of the rail gap at the rail joint comprises:
projecting a laser line across the rail with a laser emitter attached to a rail vehicle;
taking successive images of the projected line with a camera attached to the rail vehicle as the rail vehicle travels along the rail; and
sending an image data signal to a computer controller programmed to analyze the successive images to recognize the rail gap and to determine the size of the rail gap.

12. A method in accordance with claim 8, further comprising estimating axial stress in the rail based additionally upon the location of the rail joint determined using the GPS device.

13. A method for detecting axial stress in a rail, comprising:
detecting a distance of slippage of a rail anchor relative to its intended position;
detecting an incline of the rail at a location of the rail anchor using one of an inclinometer and a GPS device;
determining the location of the rail anchor using the GPS device;
detecting a temperature of the rail at the location of the rail anchor; and
estimating axial stress in the rail using a computer controller that is programmed to estimate axial stress in the rail based upon the distance of slippage and at least one of the rail temperature and the incline of the rail.

14. A method in accordance with claim 13, further comprising detecting a size of a rail gap at a rail joint, and estimating axial stress in the rail based additionally upon the size of the gap.

15. A method in accordance with claim 13, wherein detecting the rail temperature comprises detecting the rail temperature using an infrared thermometer, oriented toward the rail.

16. A method in accordance with claim 13, wherein the step of detecting the distance of slippage of the rail anchor relative to its intended position comprises:
projecting a laser line across the rail with a laser emitter attached to a rail vehicle;
taking successive images of the projected line with a camera attached to the rail vehicle as the rail vehicle travels along the rail; and
sending an image data signal to a computer controller programmed to analyze the successive images to recognize the anchor and to determine the distance of slippage.

17. A method in accordance with claim 13, further comprising estimating axial stress in the rail based additionally upon the location of the rail anchor determined using the GPS device.

* * * * *

UNITED STATES PATENT AND TRADEMARK OFFICE
CERTIFICATE OF CORRECTION

| | |
|---|---|
| PATENT NO. | : 8,934,007 B2 |
| APPLICATION NO. | : 13/428215 |
| DATED | : January 13, 2015 |
| INVENTOR(S) | : Snead |

It is certified that error appears in the above-identified patent and that said Letters Patent is hereby corrected as shown below:

In the Claims

Column 8, lines 26-28, should read,

2. A system in accordance with claim 1, wherein the computer controller is programmed to estimate axial stress in the rail further in view of the rail incline.

Signed and Sealed this
Twenty-eighth Day of April, 2015

Michelle K. Lee
*Director of the United States Patent and Trademark Office*